United States Patent
Rohden

(10) Patent No.: US 8,875,643 B2
(45) Date of Patent: Nov. 4, 2014

(54) SHIP, IN PARTICULAR FREIGHT SHIP, WITH A MAGNUS ROTOR

(75) Inventor: Rolf Rohden, Aurich (DE)

(73) Assignee: Wobben Properties GmbH, Aurich (DE)

( * ) Notice: Subject to any disclaimer, the term of this patent is extended or adjusted under 35 U.S.C. 154(b) by 13 days.

(21) Appl. No.: 13/822,180

(22) PCT Filed: Sep. 12, 2011

(86) PCT No.: PCT/EP2011/065730
§ 371 (c)(1),
(2), (4) Date: May 17, 2013

(87) PCT Pub. No.: WO2012/034968
PCT Pub. Date: Mar. 22, 2012

(65) Prior Publication Data
US 2013/0220191 A1    Aug. 29, 2013

(30) Foreign Application Priority Data
Sep. 16, 2010    (DE) .......................... 10 2010 040 920

(51) Int. Cl.
*B63B 35/00*    (2006.01)
*B63H 13/00*    (2006.01)
*B63H 9/02*    (2006.01)

(52) U.S. Cl.
CPC . *B63H 9/02* (2013.01); *Y02T 70/58* (2013.01); *B63H 13/00* (2013.01); *Y02T 70/5254* (2013.01)
USPC ...................................................... 114/39.3

(58) Field of Classification Search
USPC ...................................................... 114/39.3
See application file for complete search history.

(56) References Cited

U.S. PATENT DOCUMENTS

| 4,602,584 A | 7/1986 | North et al. |
| 8,230,798 B2 * | 7/2012 | Rohden ........................ 114/39.3 |

(Continued)

FOREIGN PATENT DOCUMENTS

| CA | 2253226 A1 | 11/1997 |
| CA | 2 610 109 A1 | 12/2006 |

(Continued)

OTHER PUBLICATIONS

Ruess, Hans-Jurgen, "Flettner-Rotorschiffe-Alte Technik fur neue Schiffe," HANSA International Maritime Journal-144, 2007, No. 12, pp. 16-22.

(Continued)

*Primary Examiner* — Lars A Olson
*Assistant Examiner* — Jovon Hayes
(74) *Attorney, Agent, or Firm* — Seed IP Law Group PLLC

(57) ABSTRACT

The invention relates to a ship comprising a plurality of Magnus rotors. Each Magnus rotor is associated with an electric motor which can be controlled individually and which is used to rotate the Magnus rotor. Each electric motor is associated with a converter in order to control the rotational speed and/or the rotational direction of the electric motor. The ship also comprises a central control unit which is connected to the converters, to control the individual converters, in order to control the rotational speed and/or the rotational direction of the Magnus rotors, independently from the other Magnus rotors. The ship also comprises an electric motor as the main drive of the ship, a converter for controlling the electric motor is associated with the electric motor. Said control unit controls the Magnus rotor in a first operational mode in such a manner that a maximal drive force is reached.

14 Claims, 5 Drawing Sheets

(56) References Cited

U.S. PATENT DOCUMENTS

| | | |
|---|---|---|
| 8,261,681 B2* | 9/2012 | Wobben ................. 114/39.3 |
| 8,539,894 B2* | 9/2013 | Levander ............... 114/39.3 |
| 8,601,964 B2* | 12/2013 | Rohden ................. 114/39.3 |
| 8,746,162 B2* | 6/2014 | Holohan et al. ......... 114/39.3 |
| 2009/0217851 A1* | 9/2009 | Kind ..................... 114/39.3 |
| 2009/0311924 A1 | 12/2009 | Wobben |
| 2012/0142235 A1 | 6/2012 | Wobben |
| 2013/0008363 A1* | 1/2013 | Winkler ................. 114/39.3 |
| 2013/0032070 A1* | 2/2013 | Winkler ................. 114/39.3 |
| 2013/0220191 A1* | 8/2013 | Rohden ................. 114/39.3 |
| 2013/0233223 A1* | 9/2013 | Rohden ................. 114/39.3 |
| 2013/0260620 A1* | 10/2013 | Rohden ..................... 440/6 |
| 2013/0291775 A1* | 11/2013 | Wobben ................. 114/39.3 |
| 2014/0102344 A1* | 4/2014 | Wobben ................. 114/39.3 |
| 2014/0137781 A1* | 5/2014 | Rohden ................. 114/39.3 |

FOREIGN PATENT DOCUMENTS

| | | |
|---|---|---|
| CN | 101198516 A | 6/2008 |
| DE | 19952460 A1 | 5/2001 |
| DE | 102005028447 A1 | 12/2006 |
| GB | 2403461 A | 1/2005 |
| JP | 62279195 A | 12/1987 |
| WO | 2006133950 A2 | 12/2006 |

OTHER PUBLICATIONS

Wagner, Claus, "Die Segelmaschine," Ernst Kabel Verlag GmbH, Hamburg, 1991, p. 156.

* cited by examiner

SHIP, IN PARTICULAR FREIGHT SHIP, WITH A MAGNUS ROTOR

BACKGROUND

1. Technical Field

The present invention concerns a ship, in particular a cargo ship, having a Magnus rotor

2. Description of the Related Art

Magnus rotors are also referred to as Flettner rotors or sailing rotors.

The Magnus effect describes the occurrence of a transverse force, that is to say perpendicularly to the axis and to the afflux flow direction, in relation to a cylinder which rotates about its axis and which has an afflux flow perpendicularly to the axis. The flow around the rotating cylinder can be interpreted as a superimposition of a homogenous flow and an eddy around the body. The irregular distribution of the overall flow results in an asymmetrical distribution of pressure at the periphery of the cylinder. A ship is thus provided with rotating or turning rotors which in the wind flow produce a force which is perpendicular to the effective wind direction, that is to say a wind direction that is corrected with the highest speed, which force can be used similarly as when sailing to propel the ship. The cylinders which stand upright rotate about their axis and air which flows in an afflux flow thereto from the side then preferably flows in the direction of rotation around the cylinder by virtue of surface friction. Therefore on the front side the flow speed is greater and the static pressure is lower so that a force in a forward direction is imparted to the ship.

Such a ship is already known from "Die Segelmaschine" by Claus Dieter Wagner, Ernst Kabel Verlag GmbH, Hamburg, 1991, page 156. That involved investigating whether a Magnus rotor, also referred to as a Flettner rotor, can be used as a drive or auxiliary drive for a cargo ship.

U.S. Pat. No. 4,602,584 discloses a drive system for a ship, having a conventional screw and rudder arrangement with one or more rotor sails. In that case production of the propulsion is effected by way of a conventional drive machine controlled by a conventional control system and utilization of the Magnus effect by the rotor sails. The conventional drive machine can drive the rotor sails which as will be noted however can also be driven by their own drive. The rotor sails are controlled by a control unit provided on the bridge and having two levers by way of which the rotary speed and direction of rotation of the rotor sails can be set in order thereby to influence the direction of the propulsion force produced by the Magnus effect.

DE 10 2005 028 447 A1 discloses a ship having a plurality of Magnus rotors, wherein an individually actuable electric motor is associated with each of the plurality of Magnus rotors for rotating the rotors. Associated with each electric motor is a converter for controlling the rotary speed and/or the direction of rotation of the electric motor.

BRIEF SUMMARY

In one embodiment, there is provided a ship, in particular a cargo ship, having a plurality of Magnus rotors, a central control unit and an electric motor as the main drive. In that case the Magnus rotors can each be individually actuated by the central control unit in a first operating mode in such a way that a maximum propulsion effect is obtained, wherein the difference between the desired propulsion and the propulsion obtained by the rotation of the Magnus rotors is afforded by the electric motor. In a second operating mode the Magnus rotors are switched off by the central control unit and the desired propulsion is afforded by the electric motor.

The difference between those operating modes is advantageous as, depending on its respective instantaneous situation of use, that is to say sailing on the open sea or entering port or docking in a harbor, the ship according to the invention can be operated in the optimum fashion and in that way the fuel consumption of the ship can be reduced and thus the economy of the ship can be increased. Thus on the open sea the course of the ship can be selected according to the direction of the wind to arrive at the destination of the voyage with a propulsion force which is produced as much as possible by the Magnus rotor and in respect of which it is possible to dispense with the main drive as much as possible. At the same time that ensures that, in situations in which the course of the ship cannot be selected according to the direction of the wind, the ship still has propulsion as then the main drive is fully employed and the Magnus rotors are shut down.

In an aspect of the invention the control unit in a third operating mode actuates the Magnus rotors in such a way that a propulsion is obtained by the Magnus rotors, which is less than the maximum propulsion of the Magnus rotors, wherein the difference of the desired propulsion and the propulsion obtained by the rotation of the Magnus rotors is obtained by the electric motor. That operating mode increases the economy of the ship according to the invention as, in situations in which the Magnus rotors can admittedly be used but the course of the ship cannot be optimized for the action thereof, nonetheless support for propulsion of the ship can be afforded if the direction of incidence of the wind, in combination with the given course of the ship, produces a propulsion force. In that way, in that operating mode, it is possible for the main drive to be supported and assisted by the Magnus rotors so that in this case too fuel can be saved.

In a further aspect of the invention, the ship according to the invention, a cargo ship, further has a propeller driven by the electric motor. The ship also has an internal combustion engine coupled to an electric generator to generate electrical energy. The ship further has an operating unit for predetermining the desired propulsion. In that respect the desired propulsion in the first operating mode is the absolute or relative speed of the ship, in the second operating mode it is the pitch of the propeller and in the third operating mode it is the absolute or relative power of the electric motor.

It is advantageous in that respect that the operational-friendliness of the ship according to the invention can be increased by the provision of an operating unit, in which different presettings for propulsion can be activated, depending on the respective operating mode of the ship. That is advantageous for the reason that a different evaluation of the magnitude of the propulsion effect is implemented in each operating mode. Thus in the case of a maneuvering procedure, for example in a port, it is advantageous for the magnitude of the forward or rearward movement to be adjusted by the pitch control of the propeller as in that way the forward or rearward movement can be controlled very finely and with only a slight time delay. On the other hand, on the high seas, it is markedly more appropriate for the crew of the ship to predetermine the desired speed, in absolute or relative terms.

In an aspect of the invention the control unit receives a wind speed, a wind direction, a predetermined destination of the ship, and/or navigation information from a navigation unit. That is advantageous as the necessary items of information for calculating a course for the ship are thereby available to the control system of the ship.

In a further aspect of the invention the control unit controls the rotary speed and/or the direction of rotation of the Magnus rotors in dependence on the wind speed, the wind direction, the predetermined course and/or the navigation information of the navigation unit. It is advantageous in that respect that an optimum action on the part of the Magnus rotors can be achieved for generating propulsion for the ship and in that way at the same time the fuel consumption of the ship can be reduced.

In an aspect of the invention the control unit uses characteristic curves provided in the control unit for determining the rotary speed and/or the direction of rotation of the Magnus rotors. The propulsion can be optimized for each individual Magnus rotor by the use of those characteristic curves which can be provided individually for each Magnus rotor, as its precise performance is known in terms of generating the propulsion force in dependence on speed of rotation and direction of rotation and wind speed. Those characteristic curves can be determined individually or also jointly by calculation or by measurements for each Magnus rotor.

In a further aspect of the invention the control unit determines a course in respect of which the propulsion obtained by the rotation of the Magnus rotors is maximum, in dependence on the wind speed, the wind direction, the predetermined destination and/or the navigation information. In that way the propulsion produced by the Magnus rotors can be maximized as the control system, in determining the course, is orientated substantially to the wind conditions and utilizes same in the optimum fashion, whereby the ship according to the invention sails as much as possible to the destination and thus also the propulsion generated by the main drive due to fuel consumption is minimized.

In an aspect of the invention the control unit controls the ship in such a way as to assume the given course in respect of which the propulsion obtained by the rotation of the Magnus rotors is maximum. In that way selection and implementation of the course can be left to the control insofar as it determines a course which is optimum for utilization of the propulsion force afforded by the Magnus rotor, and also follows that course, in order thereby always to react immediately to changing wind conditions, in particular a change in the direction of the wind, and thereby to optimize the fuel saving.

In a further aspect of the invention for each operating mode the control unit calculates the consumption of the fuel of the internal combustion engine, compares said consumption to the consumption of other ships which are comparable in respect of size, and outputs the calculated consumption and the result of the comparison. In that way the economy of the ship according to the invention can be assessed at any time by the crew of the ship or also other receivers of that information which can also be transmitted by means of data transmission for example wirelessly to receivers outside the ship.

In a further aspect of the invention there is provided a plurality of internal combustion engines which are respectively coupled to an electric generator of a plurality of generators to generate electrical energy. In addition to produce a required electrical energy the control unit switches on so many internal combustion engines of the plurality of internal combustion engines that the required electrical energy is at least generated by the respective generators and shuts down so many internal combustion engines of the plurality of internal combustion engines that the consumption of fuel by the internal combustion engines is minimized. In that way, instead of a single large internal combustion engine, it is possible to use a plurality of smaller internal combustion engines. That is advantageous as, instead of operating the one large internal combustion engine, individual smaller internal combustion engines can be shut down at times depending on the respectively required power and in that way can be treated carefully in regard to wear. In addition, in the event of damage to or failure of one of the smaller internal combustion engines, it can be shut down and repaired or replaced without operation of the remaining internal combustion engines being limited thereby.

BRIEF DESCRIPTION OF THE SEVERAL VIEWS OF THE DRAWINGS

Embodiments by way of example and advantages of the invention are described in greater detail hereinafter with reference to the following Figures.

DETAILED DESCRIPTION

Figure 1:
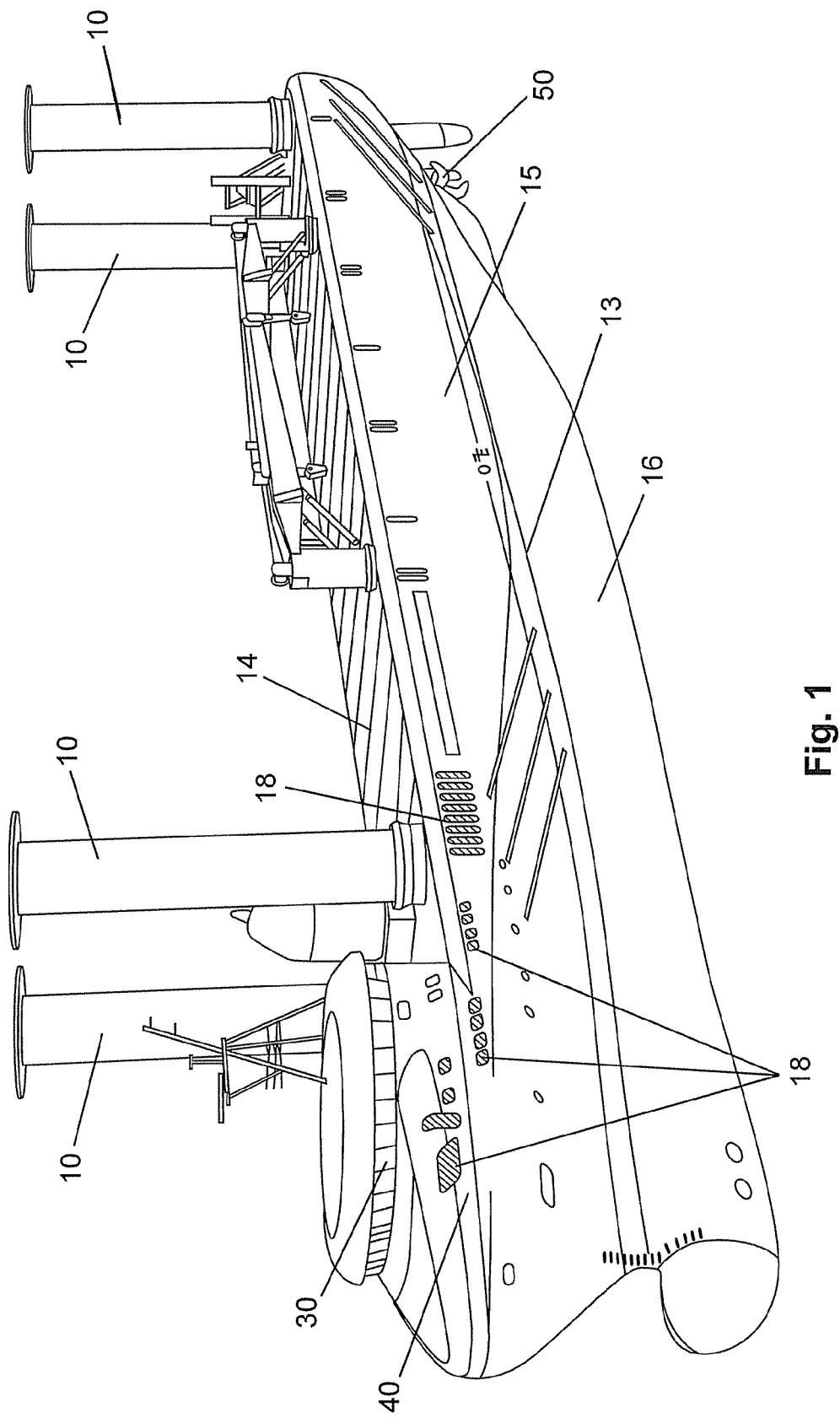
FIG. 1 shows a perspective view of a ship according to a first embodiment.

FIG. 1 shows a diagrammatic view of a ship according to a first embodiment. In this case the ship has a hull comprising an underwater region 16 and an above-water region 15. The ship further has four Magnus rotors 10 or Flettner rotors 10 which are arranged at the four corners of the hull and are preferably cylindrical. In this case the four Magnus rotors 10 represent wind-operated drives for the ship according to the invention. The ship has a deckhouse 40 arranged in the forecastle, with a bridge 30. The ship has a screw 50 or a propeller 50 underwater. For improved maneuverability the ship can also have transverse thruster rudders, wherein preferably one is provided at the stern and one to two transverse thruster rudders are provided at the bow. Preferably those transverse thruster rudders are driven electrically. The accommodation quarters, galleys, provision storerooms, messes and so forth are arranged in the deckhouse 40. In this case the deckhouse 40, the bridge 30 and all superstructures above the weather deck 14 are of an aerodynamic shape to reduce wind resistance. That is achieved in particular by substantially avoiding sharp edges and sharp-edged structures. To minimize the wind resistance and to achieve an aerodynamic shape, as few superstructures as possible are provided.

Figure 2:
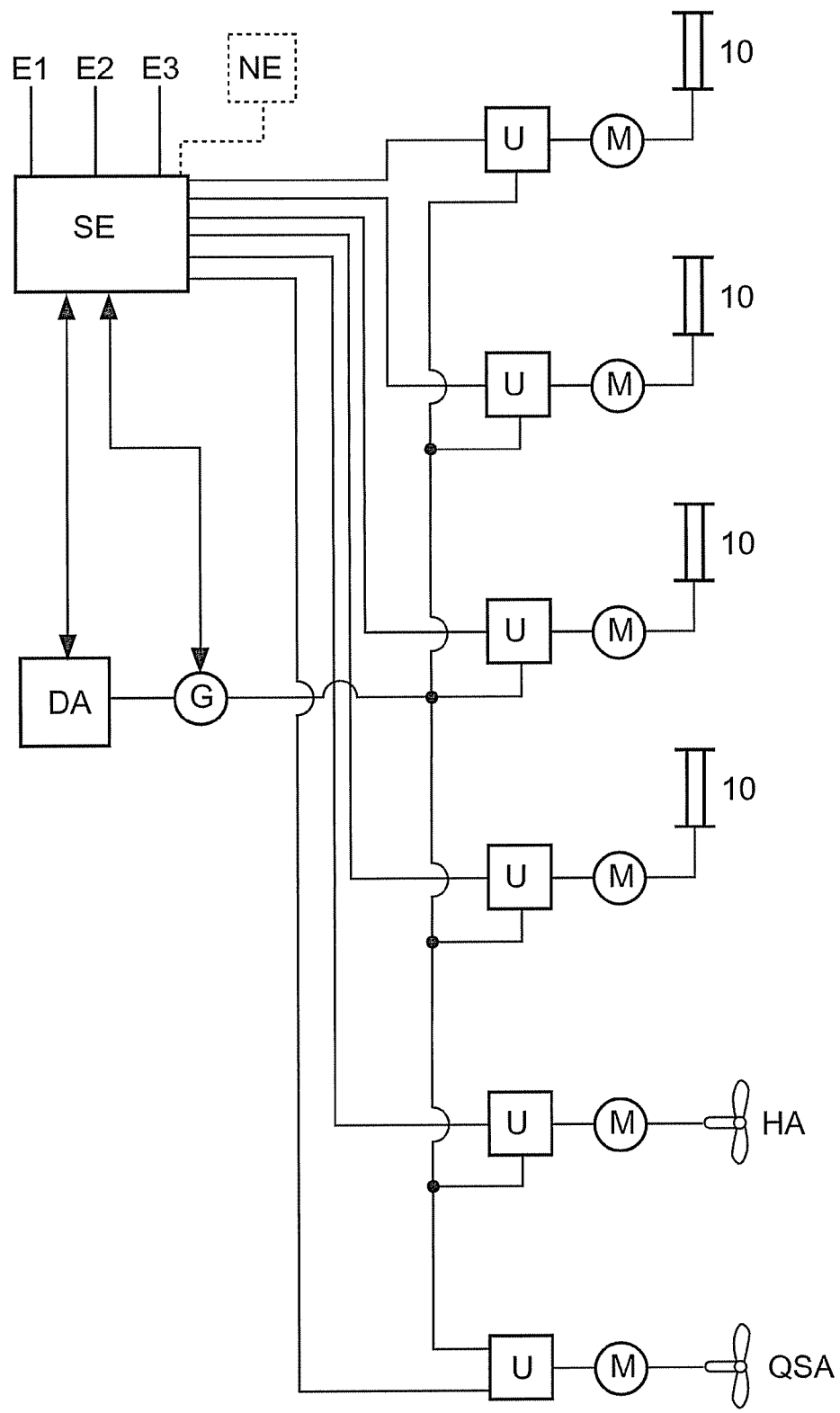
FIG. 2 shows a block circuit diagram of a control of the ship according to the first embodiment of FIG. 1.

FIG. 2 shows a block circuit diagram of a control of the ship according to the first embodiment of FIG. 1. Each of the four Magnus rotors 10 has its own motor M and a separate converter U. The converters U are connected to a central control unit SE. A diesel drive DA is connected to a generator G to generate electrical energy. In this case instead of a diesel drive DA it is also possible for an assembly of a plurality of individual diesel drives DA to be connected to the generator G or a corresponding number of individual generators G which, respectively considered as a whole, make the same power available to the exterior as a correspondingly single large diesel drive DA or generator G. The respective converters U are connected to the generator G. In addition the Figure shows a main drive HA also connected to an electric motor M which in turn is connected with a separate frequency converter U both to the control unit SE and also to the generator G. In this case the four Magnus rotors 10 can be controlled both individually and also independently of each other.

The control for the Magnus rotors 10 and the main drive HA is implemented by the control unit SE which determines the appropriate rotary speed and direction of rotation for the individual Magnus rotors 10 and the main drive HA to achieve the desired propulsion force, from the currently prevailing wind measurements (wind speed, wind direction) E1, E2, and on the basis of the items of information relating to target and actual travel speed E3 (and optionally on the basis of items of navigation information from a navigation unit NE. In dependence on the thrust force of the four Magnus rotors 10 and the currently prevailing speed of the ship and the target value of the speed, the control unit SE steplessly regulates the main drive installation HA down, insofar as that is required. Thus the wind energy power can be directly and automatically converted into a fuel saving. The independent control of the Magnus rotors 10 means that the ship can also be controlled without the main drive HA. In particular stabilization of the ship in a heavy swell can be achieved by suitable control of the respective Magnus rotors 10.

In addition there can be one or more transverse thruster rudders QSA to improve maneuverability of the ship. In this case one transverse thruster rudder QSA can be provided at the stern and one to two transverse thruster rudders QSA can be provided forwardly on the ship. Associated with each transverse thruster rudder QSA are a motor M for the drive and a converter U. The converter U is in turn connected to the central control unit SE and the generator G. In that way the transverse thruster rudders (only one is shown in FIG. 2) can also be used for controlling the ship as they are connected to the central control unit SE (by way of the converter U). The transverse thruster rudders QSA can each be actuated individually in respect of their rotary speed and direction of rotation by the central control unit SE. Control in that case can be effected as described hereinbefore.

Figure 3:
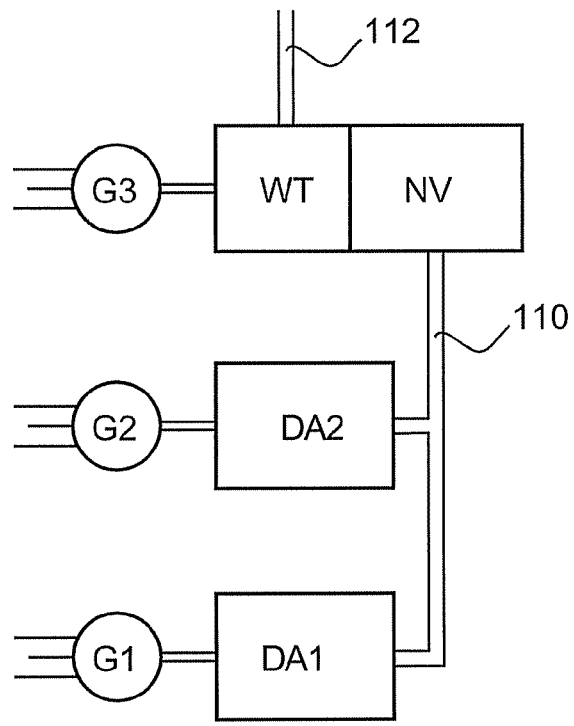
FIG. 3 shows a diagrammatic view of a generating system for electrical energy.

FIG. 3 shows a diagrammatic view of a generating system for electrical energy. The generating system in FIG. 3 can be integrated in the control shown in FIG. 2. By way of example the Figure shows two diesel drives or internal combustion engines DA with electric generators G1, G2 connected downstream thereof. The exhaust gases from the diesel drives DA are discharged in an exhaust pipe 110 and passed to a post-combustion unit NV. In that post-combustion unit NV the constituents of the exhaust gas, which have not yet been burnt in the diesel drives DA, are burnt and that combustion heat but also a considerable part of the heat of the exhaust gas is taken therefrom by way of a downstream-connected heat exchanger WT and used for driving a further generator G3 which produces additional electrical energy from that heat. Thus the diesel drives DA are correspondingly less heavily loaded and their fuel consumption is correspondingly less. The exhaust gases which have been post-treated in that way can then be expelled by way of a funnel 112. As shown in FIG. 2 the electrical energy generated by the generators G1 to G3 can be fed to the motor M of the main drive HA for example by way of an electrical on-board network. In addition the converters U and the electric motors M of the Magnus rotors 10 can be supplied with electrical energy by way of the on-board network. The on-board network can further be used to ensure the electrical power supply for the ship.

Figure 4:
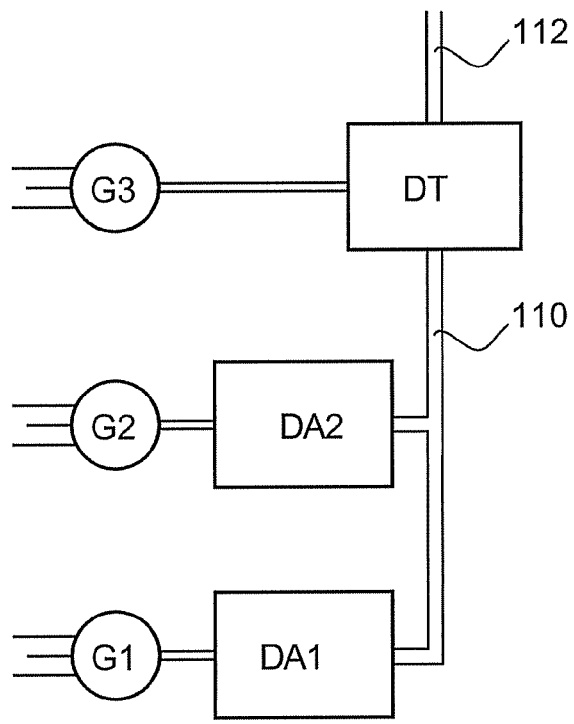
FIG. 4 shows a diagrammatic view of a further generating system for electrical energy.

FIG. 4 shows a diagrammatic view of a further generating system for electrical energy. In this case the illustrated components of the generating system for electrical energy and their reference numerals correspond to those in FIG. 3. In this embodiment, a steam turbine DT is provided as an alternative to the post-combustion unit NV and the heat exchanger WT.

It will be noted however that the steam turbine can also be provided jointly with the post-combustion unit NV and the heat exchanger WT in FIG. 3. In this case the exhaust gases from the diesel drives DA are fed to the steam turbine DT through the exhaust pipe 110. The steam turbine DT uses the hot exhaust gases to produce superheated steam with which a turbine is driven to generate electrical energy. The exhaust gases which are cooled down in the steam turbine DT are then discharged by way of a funnel 112. The electrical energy produced in that way is then fed into the on-board network of the ship and in that way can also be made available to the main drive HA, the transverse thruster rudders QSA and/or the motors M of the Magnus rotors 10 and other consumers in the on-board network.

Figure 5:
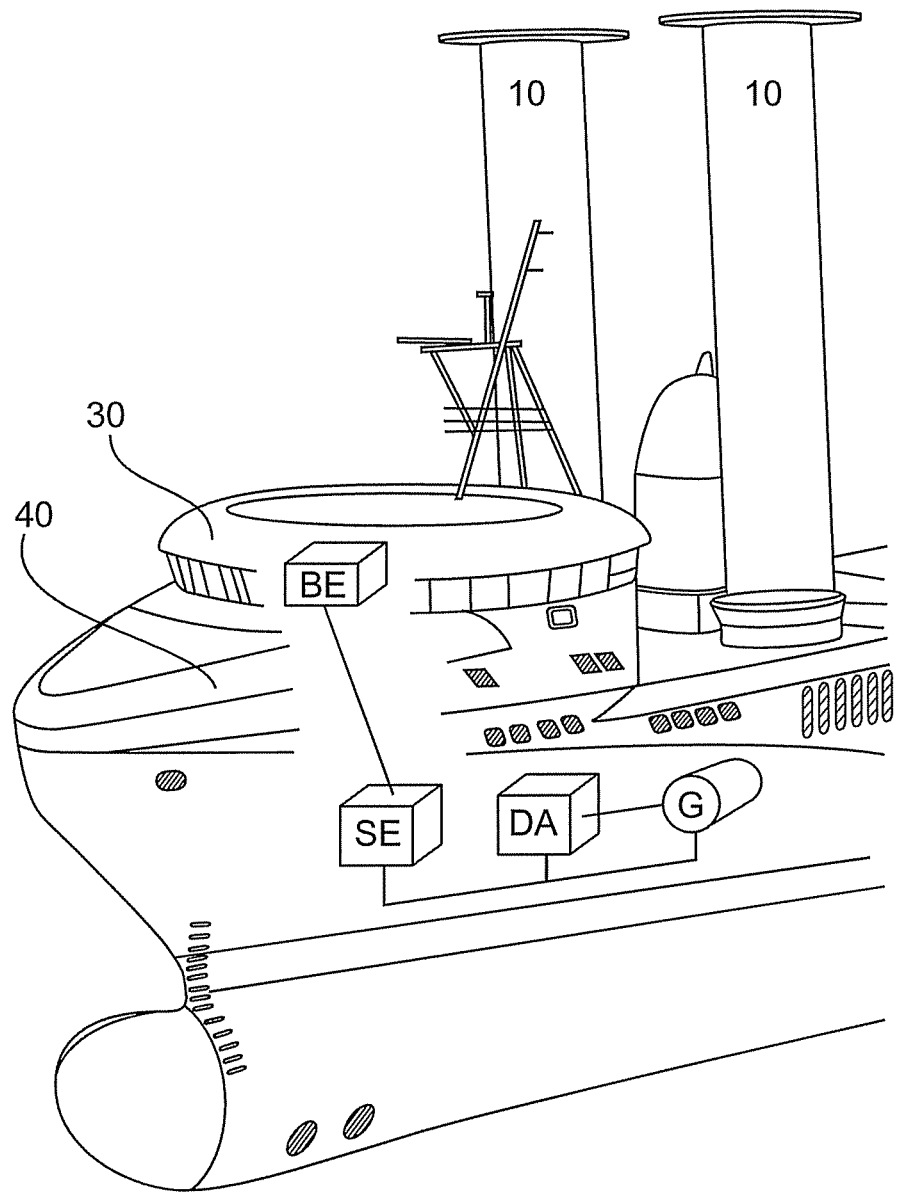
FIG. 5 shows a perspective view of the ship according to the first embodiment with parts of the control shown in FIG. 2.

FIG. 5 shows a perspective view of the ship according to the first embodiment with parts of the control shown in FIG. 2. The Figure shows the control unit SE for actuating the diesel drive DA and the generator G. Further devices of the control shown in FIG. 2 are not shown here to improve clarity of the drawing. The control unit SE is connected to an operating unit BE which can arranged for example on the bridge of the ship. Inputs by the crew of the ship to the control unit SE can be activated by way of that operating unit BE. The operating unit BE can have various input options such as a keyboard or a touchscreen display. It is also possible to provide knobs for pressing or turning, keys, switches, levers or the like as input means. They can be physically defined and/or can be virtually displayed for example on a touchscreen display. It is also possible to implement inputs to the control unit SE by means of speech input, for example by way of a microphone. In addition items of information and messages of the control unit SE can also be displayed and outputted by means of the operating unit BE, for example optically on display elements such as displays or monitors, acoustically by way of loud speakers etc., in the form of signal or warning sounds or a spoken message or also by means of a printer or plotter in the form of a printout on paper or the like.

Figure 6:
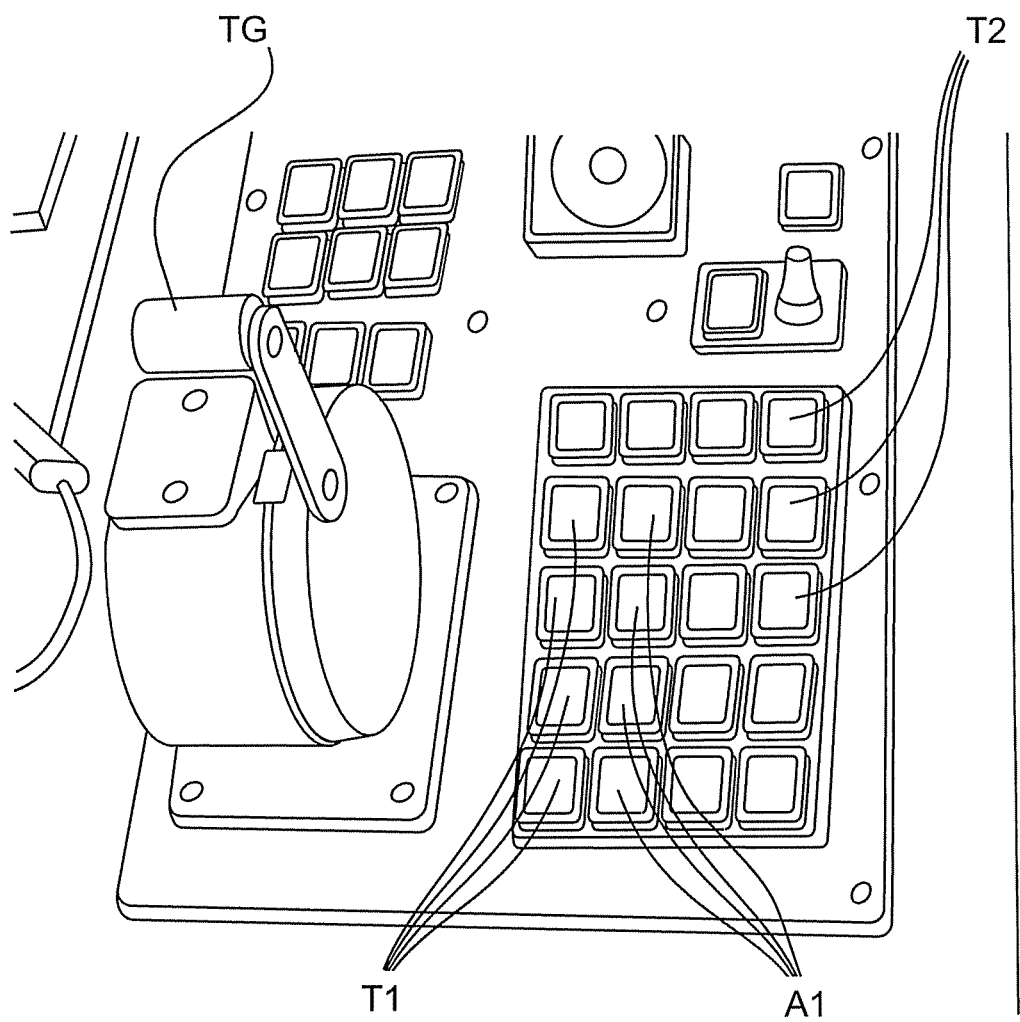
FIG. 6 shows a view of an operating unit of the ship according to the first embodiment.

FIG. 6 shows a view of an operating unit of the ship according to the first embodiment. The Figure shows a so-called telegraph TG as can be used on ships for setting for example a speed of the ship or a number of revolutions of the main drive HA. Arranged to the right therebeside is a keypad having a vertical row of keys T1 for the input of a mode into which the ship is put by depressing that key. To the right beside the vertical row of keys T1 in parallel therewith is a vertical row of displays A1 associated with the respective keys T1 and showing whether the corresponding key T1 has been actuated and thus the corresponding mode has been selected. In addition, further to the right, there is a second vertical row of keys T2, by way of the actuation of which a respective operating procedure of a mode can be selected. In that respect those operating procedures represent sub-functions of a mode or also of a plurality of modes. The selection of an operating procedure by way of the keys T2 is respectively displayed by a display integrated in the key T2.

The operating unit BE can be used to control inter alia inputs like the course of the ship or the position of the rudder, the speed of the ship, the number of revolutions of the propeller 50, by way of the telegraph TG, or inputs like the use of the transverse thruster rudders QSA, switching the diesel drive DA on and off and the like, by way of the keys T1 and/or the keys T2. Such inputs can be effected in the form of manual presettings in a manual mode by the crew of the ship or can also be a constituent part of automated sequences of the control in various automatic modes of the control.

To make full use of the possible options afforded by the ship according to the invention for economical operation, a control is required, which makes optimum use of the various possible ways of generating electrical energy and converting it into the propulsion force for the ship. In that respect the devices shown in FIGS. 2 to 4 for generating electrical energy and the devices for producing the propulsion force for the ship, with the consumption of electrical energy, can be summarized as follows:

devices for generating electrical energy:
    diesel drive DA with generator G; and
    post-combustion unit NV and heat exchanger WT or steam turbine DT for exhaust gases from the diesel drive DA;
devices for producing the propulsion force for the ship with the consumption of electrical energy:
    main drive HA, that is to say propeller 50 with motor M and converter U; and
    Magnus rotor 10 with motor M and converter U.

The transverse thruster rudders QSA with motor M and converter U also consume electrical energy but produce therefrom a force directed transversely to the direction of travel of the ship. As that transverse force is not directed to the forward propulsion of the ship the transverse thruster rudders QSA are disregarded in that listing.

To fully utilize the possible options of the ship according to the invention for economical operation it is provided that the ship can be operated in various automated modes. Each of those modes is intended for a given kind of ship operation. It is possible to switch over between those automated modes by means of the operating unit BE used by the ship's crew, and also between a manual mode and automated modes. In that respect, in the case of a fault, automatic shut-down of the automated modes can also be implemented by the control so that then the ship can continue to be safely operated in the manual mode under the control of its crew. In all modes the corresponding procedures are stored in the control in the form of automated sequences.

A harbor mode can be provided as a first mode, in which the ship is berthed in a harbor against the quay wall, for example for loading or unloading. There is no provision for the ship to move in that harbor mode, that is to say the main drive HA or the propeller 50 and the transverse thruster rudders QSA are shut down. Equally the motors of the Magnus rotors 10 are shut down as no propulsion force is required or may be produced. Thus the harbor mode is determined by the ship not having any propulsion force. The diesel drive DA can be operated by way of the control unit SE in order to supply electrical energy to the on-board network, for example for operation of the control unit SE itself, the operating unit BE and the electrical power supply to the cabins and accommodation quarters of the ship, on-board ship cranes or other loading apparatuses, hatches of the load hold, lighting installations and so forth. In that respect either a single diesel drive DA on the ship can be operated at a correspondingly low level of power output, or a plurality of diesel drives DA out of a multiplicity of diesel drives DA can be shut down while a diesel drive DA or a plurality of diesel drives DA out of a multiplicity thereof are switched on.

A second mode can be a maneuver mode. It can be used to maneuver within a harbor, a lock, a shipyard, a narrow river or canal or the like, that is to say to move the ship for example away from the key wall or the lock wall or to berth it thereagainst or to move the ship in close proximity with obstacles. For that purpose, besides the main drive HA or propeller 50, it is possible to use the transverse thruster rudders QSA if they are provided on the ship. Therefore in the maneuver mode at least one diesel drive DA can also be operated or possibly a plurality of diesel drives DA out of a multiplicity thereof if the plurality of diesel drives DA are provided for jointly affording the electrical energy required in the maneuver mode. In addition in the maneuver mode all apparatuses which are also involved in the harbor mode can be supplied by way of the on-board network.

A river mode can be provided as a third mode. That mode can be used on wider areas of water such as a wide canal, for example the Kiel canal, a wide navigable river or in waters near the coast and in shipping waterways or shipping lanes. Lateral maneuvering is not intended in those situations, for which reason the transverse thruster rudders QSA are shut down. It can further be assumed that in the river mode the course and speed of the ship can be maintained over prolonged periods of time, unlike the case with the maneuver mode which is characterized by the short-lived nature of its maneuvering actions. Thus the Magnus rotors 10 can be operated in the river mode in order to produce a part of the required propulsion force by way of the rotors and to appropriately cut back the main drive HA or the propeller 50. In that case however the use of the Magnus rotors 10 is limited so that the propulsion force produced by the Magnus rotors 10 does not exceed a given relationship with the propulsion force produced by the main drive HA. That can be effected for example by limiting the rotary speed of the Magnus rotors 10.

In that respect it is to be observed that in that river mode the maneuverability of the ship is markedly restricted by the narrowness of the river, the canal or the shipping lane or the proximity to the coast, to shallow waters or to other marine craft so that the course of the ship cannot be selected just as may be desired and cannot be oriented to the direction of the wind to optimize the Magnus effect. Thus, when the direction of incidence of the wind is favorable a part of the propulsion force can be obtained by means of the Magnus rotors 10, but the course of the ship can be only slightly adapted to the direction of the wind. Therefore a propulsion force can be only partially produced by means of the Magnus rotors 10, and that propulsion force relieves the load on the main drive HA or the propeller 50 and thereby reduces the power demand of the diesel drive DA. If a part of the propulsion force can be obtained from the Magnus rotors 10 then the single diesel drive DA can be operated at a correspondingly lower level of power output or some diesel drives DA of a multiplicity thereof can be shut down and some diesel drives DA of the multiplicity thereof can be operated to provide a lower level of joint power.

Moreover in this third river mode the post-combustion unit NV and the heat exchanger WT or the steam turbine DT can also be used to make use of the exhaust gases from the diesel drive DA as it is only in a continuous mode of operation of the diesel drive DA, that is to say in a steady operating mode, that the complication and expenditure involved in starting up and operating the post-combustion unit NV and the heat exchanger WT or the steam turbine DT is worthwhile and generates more electrical energy than is required for start-up and operation itself.

A fourth mode is referred to as the sea mode. That is intended for travel on the high seas, that is to say in the form of free travel without obstacles around which the ship has to maneuver. In that fourth sea mode production of the propulsion force by the Magnus rotors 10 can be put to optimum use as the course of the ship can be oriented to the direction of incidence of the wind, that is to say selecting the course of the ship makes it possible to achieve a direction of incidence of the wind in transverse relationship with the longitudinal direction of the ship in order to optimize the propulsion force generated by the Magnus rotors 10. To implement an optimum propulsion force produced by the Magnus rotors 10 in that fourth sea mode the Magnus rotors 10 are driven at their full rotary speed. In addition, by virtue of the stable steady drive conditions the post-combustion unit NV and the heat exchanger WT or the steam turbine DT can be operated at their full power output capacity to utilize the exhaust gases from the diesel drive DA. In that way, in that fourth sea mode, with appropriately suitable wind conditions, it is possible to throttle down the power of the diesel drive DA to that extent and/or and to shut down a suitable number of diesel drives DA out of the multiplicity thereof and thereby to save fuel to the extent to which the desired propulsion force can be obtained from the Magnus rotors 10. In addition it is possible to obtain from the remaining power of the diesel drive or drives DA, electrical energy which is produced by means of the post-combustion unit NV and the heat exchanger WT or the steam turbine DT. The transverse thruster rudders QSA are shut down in that mode.

The course can be substantially freely determined in that fourth sea mode. It will be appreciated that other marine craft are to be observed in that case. Nonetheless with early recognition of that other traffic and with knowledge of the area of the sea involved it is already possible at an early time to set a course which safely avoids collisions and which nonetheless allows a very free choice of course, which is adapted to the prevailing wind conditions. Thus that almost freely selectable course can be used to optimize the drive performance in regard to various points of view:

Mode of Operation for Optimizing the Time Saving (Time Safe Mode)

In this case arriving at the destination port as quickly as possible is the highest priority in choosing the course. Therefore a path which is as direct as possible to the destination port is selected and the desired speed is achieved decisively with the main drive HA or the propeller 50. Support and assistance for the propulsion force is afforded by operation of the Magnus rotors 10 if they produce a propulsion force with the predetermined course, by virtue of the direction of the wind. However, the course is expressly not oriented in order to provide a propulsion force produced by the Magnus rotors 10. In other words, in this operating procedure with the sea mode, as in a conventional ship, the course is determined on the basis of the shortness of the distance to be travelled, and supporting assistance for the propulsion force by means of the Magnus rotors 10 is afforded only if that occurs randomly on the basis of the direction of the wind in combination with the predetermined course of the ship.

Mode of Operation for Optimizing Costs (Cost Safe Mode)

In this mode of operation orientation and calculation of the course are effected in such a way that the operating costs are compared to the schedule costs. The operating costs include inter alia the fuel consumption of the diesel drives DA. Thus a course is preset to such an effect that for example a schedule can reliably observed, that is to say the ship reaches the destination port punctually but at the same time the time remaining for that purpose is fully utilized by virtue of the adaptation of the speed or optimization of use of the propulsion force due to the Magnus rotors 10. In other words, the ship does not sail faster than necessary in order to reduce fuel consumption and nonetheless punctually arrive at the destination to avoid a schedule penalty or the like.

Mode of Operation for Optimizing Fuel Consumption (Fuel Safe Mode)

In this operating procedure in the sea mode the course is optimized by the control to the effect that the propulsion force is produced as much as possible by means of the Magnus rotors 10 and the diesel drive DA can be very substantially throttled back, whereby it is possible to achieve the greatest possible fuel saving. In this mode of operation therefore the course, insofar as the destination port, the region of the sea and the ship traffic allow, is adapted to the direction of the wind in order always to provide for a direction of incidence of the wind from abeam, that is to say transversely to the longitudinal direction of the ship, with which the Magnus effect is at its greatest. In other words in this mode of operation the ship sails to the destination port as much as possible by means of the Magnus rotors 10 with a wind which blows from abeam as much as possible.

As, without a particular need to arrive at the destination port as quickly as possible, it can be assumed that, if there is any doubt, the mode of operation of the ship is to be optimized in terms of reducing the fuel consumption, the operating procedure adopted in the fourth sea mode for optimizing fuel consumption (fuel safe mode) can be predetermined as the standard setting as soon as the fourth sea mode is selected.

In all the aforementioned modes in which the Magnus rotors 10 are operated the wind direction and the wind speed are determined by the control and used for operation of the Magnus rotors 10, in respect of determining the direction of rotation and the rotary speed, as described hereinbefore with reference to FIG. 2. In that respect moreover depending on the respective mode involved, the output power of the main drive or the desired speed of the ship which is also referred to by the control when determining the rotary speed and direction of rotation of the Magnus rotors 10 is also predetermined by the crew of the ship by means of the operating unit BE. Respective power curves are preset in the control unit SE for the Magnus rotors 10, and those power curves are used when determining the rotary speed in dependence on the measured wind direction and wind speed and the desired power or speed. For that purpose it is possible to use theoretical calculated power curves, and equally power curves which were ascertained by measurements, for example on especial measurement voyages.

The operation of switching over between those four modes can be effected by way of the operating unit BE. In addition, presetting parameters which can be different depending on the respectively selected mode can be activated by the crew of the ship by way of the operating unit BE. Thus, the pitch angle of the propeller 50 can be set directly to maneuver the ship by means of the main drive HA by way of a so-called travel lever or also machine telegraphs, for example in the first harbor mode.

In the second maneuver mode the pitch of the propeller 50 can be directly predetermined by way of the travel lever. In that way, when the main drive HA is rotating at a constant speed and direction, the propulsion force and the direction of travel of the ship, that is to say forwards or backwards, can directly predetermined by the change in propeller pitch, by way of the operating unit BE.

In the third river mode the power of the main drive HA or the propeller 50 which is to be maintained by the control can be predetermined directly by way of the travel lever of the operating unit BE. In that respect the way in which that power can be achieved, that is to say which power is produced by the Magnus rotors 10 and which remaining power has to be additionally produced by the diesel drive DA or the multiplicity thereof, can be left to the control. Thus for example a power output from the main drive HA or the propeller 50 of 2,000 kW can be predetermined.

In the fourth sea mode the speed of the ship can be predetermined as an absolute value or also relative to the maximum speed of the ship, by way of the travel lever of the operating unit BE. The control can then optimize the course of the ship and the direction of rotation and rotary speed of the Magnus rotors 10 in such a way that the predetermined speed is attained with the lowest possible use of the diesel drive DA or the lowest possible number of diesel drives DA out of the multiplicity thereof. A speed of 75% for example can be predetermined as the input, which can correspond to an absolute speed of 16 knots.

Various items of information can also be made available to the crew of the ship by means of the operating unit BE, depending on the respective mode involved. Thus there can always be an output, on the basis of the inputs of which the control has at the present time selected a mode and/or an operating procedure as part of a mode, or which mode and/or which operating procedure are set by the crew of the ship. Measurement values can be displayed such as for example wind direction or wind speed, which as shown in FIG. 2 are inputted as measurement values E1 and E2 into the control unit SE, or target and actual travel speeds E3 and optionally the items of navigation information of a navigation unit NE.

To evaluate the economy of operation of the ship it is also possible for example daily once at 00.00 hour to effect an automated calculation of the fuel consumption of the preceding day or another predetermined or adjustable period of time. In that case the consumption of the ship according to the invention can be assessed in relation to comparable ships, for example by means of reference tables, stored in the control, of average values of the fuel consumption of those ships in order in this way to obtain the fuel saved by the ship according to the invention for the preceding day or also another period of time, in comparison with conventional ships of comparable size.

The idea of the invention concerns the use of Magnus rotors 10 and a propeller 50 or main drive HA in a combination such that the main drive HA, when the wind is inadequate, only has to afford the difference in power that cannot be supplied by the Magnus rotors 10. It is intended that the ship is basically driven with the Magnus rotors 10 and the propeller 50 or the main drive HA is used only to supplement the propulsion force when wind conditions are inadequate. In that respect the Magnus rotors are designed in such a way that operation thereof provides the same power (about 6000 kW) as the propeller. When the wind is adequate therefore the ship is driven entirely by the Magnus rotors 10. That is achieved for example at a wind speed of 12 to 14 meters per second so that the propeller 50 or the main drive HA can be switched off as it is no longer required for propelling the ship.

Thus control of the main drive HA is effected in such a way that the Magnus rotors 10 produce the maximum power or approximately the maximum power. An increase in the power from the Magnus rotors thus leads directly to a fuel saving as no additional energy has to be generated for the electric drive by the main drive HA. The fuel saving is thus afforded without adaptation being required between a main drive HA or propeller 50 driven by an internal combustion engine, and the control of the Magnus rotors 10.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A cargo ship, comprising:
a plurality of Magnus rotors;
individually actuable electric motors each associated with one of the plurality of Magnus rotors to rotate the associated Magnus rotor;
converters associated with the electric motors, respectively, to control at least one of rotary speed and direction of rotation of the electric motor;
a central control unit connected to the converters for controlling the converters to control at least one of the rotary speed and the direction of rotation of each of the Magnus rotors independently of the other Magnus rotors;
an operating unit for setting a desired propulsion;
a main electric motor as a main drive of the ship, wherein a converter is associated with the main electric motor for controlling the main electric motor,
wherein the control unit is configured to operate in first, second, and third operating modes,
wherein in the first operating mode, the control unit actuates the Magnus rotors in such a way that a maximum propulsion is obtained, wherein a difference between a desired propulsion and a propulsion obtained by the rotation of the Magnus rotors is obtained by the main electric motor,
wherein in the second operating mode, the control unit shuts down the Magnus rotors and the desired propulsion is obtained by the main electric motor, and
wherein in the third operating mode, the control unit actuates the Magnus rotors in such a way that a propulsion is obtained by the Magnus rotors, that is less than a maximum propulsion of the Magnus rotors, wherein a difference of the desired propulsion and the propulsion obtained by the rotation of the Magnus rotors is obtained by the main electric motor, and
a propeller that has an adjustable pitch angle and is driven by the main electric motor;
an internal combustion engine coupled to an electric generator to generate electrical energy, and
wherein in the first operating mode the desired propulsion is the absolute or relative speed of the ship,
wherein in the second operating mode the desired propulsion is adjustable by way of the pitch inclination of the pitch angle of the propeller, and
wherein in the third operating mode the desired propulsion is the absolute or relative power of the electric motor.

2. The cargo ship according to claim 1, wherein the control unit receives at least one of a wind speed, a wind direction, a destination of the ship, and navigation information from a navigation unit.

3. The cargo ship according to claim 2, wherein the control unit controls at least one of the rotary speed and the direction of rotation of the Magnus rotors depending on at least one of wind speed, the wind direction, destination and navigation information of the navigation unit.

4. The cargo ship according to claim 3, wherein the control unit uses characteristic curves for determining the rotary speed and/or the direction of rotation of the Magnus rotors.

5. The cargo ship according to claim 2, wherein the control unit determines a course based on the propulsion obtained by the rotation of the Magnus rotors is maximum, depending on at least one of wind speed, wind direction, destination and the navigation information.

6. The cargo ship according to claim 5, wherein the control unit controls the ship to assume the given course.

7. The cargo ship according to claim 1, wherein for each of the first, second, and third operating modes, the control unit calculates a corresponding consumption of fuel of the internal combustion engine, compares said consumption to the consumption of other ships having a comparable size, and outputs the calculated consumption and a result of the comparison.

8. A cargo ship according to claim 1, further comprising:
a plurality of internal combustion engines each being coupled to a respective electric generator to generate electrical energy,
wherein the control unit is configured to start up a number of the internal combustion engines to produce a particular electrical energy that is at least generated by the respective generators and shuts down a number of the internal combustion engines such that consumption of fuel by the internal combustion engines is minimized.

9. A method of operating a cargo ship, comprising a plurality of Magnus rotors, the method comprising:
independently controlling at least one of a rotary speed and a direction of rotation of a plurality of electric motors each associated with a respective Magnus rotor;
identifying a desired propulsion; and
operating in at least one of a first operating mode, a second operating mode, and a third operating mode;
in the first operating mode actuating the Magnus rotors in such a way that a maximum propulsion is obtained, wherein the difference between the desired propulsion and the propulsion obtained by the rotation of the Magnus rotors is obtained by an electric motor;
in the second operating mode shutting down the Magnus rotors and actuating the electric motor in such a way that the desired propulsion is obtained by the electric motor; and
in the third operating mode actuates the Magnus rotors in such a way that a propulsion is obtained by the Magnus rotors that is less than a maximum propulsion of the Magnus rotors, wherein a difference of the desired propulsion and the propulsion obtained by the rotation of the Magnus rotors is obtained by the electric motor,
wherein the cargo ship has a propeller that is driven by the electric motor.

10. The method of claim 9 further comprising receiving a wind speed and a wind direction and using the wind speed and wind direction to determine which of the first, second, and third operating modes to operate in.

11. A cargo ship, comprising:
a plurality of Magnus rotors;
individually actuable electric motors each associated with one of the plurality of Magnus rotors and configured to rotate the associated Magnus rotor;
converters associated with the electric motors, respectively, to control a rotary speed and direction of rotation of the electric motor;
a main electric motor as a main drive of the ship, wherein a converter is associated with the main electric motor for controlling the main electric motor;
a propeller that is driven by the main electric motor; and
a central control unit connected to the converters for controlling the converters thereby controlling the rotary speed and direction of rotation of each of the Magnus rotors independently of the other Magnus rotors and for controlling the main electric motor, the control unit configured to receive a desired course and a desired arrival time, the control unit being configured to calculate a desired propulsion based on the desired course and the desired arrival time, wherein the control unit is configured to operate in first and second operating modes,
wherein in the first operating mode, the control unit actuates the Magnus rotors to operate at a maximum state, wherein a difference between the desired propulsion and a propulsion obtained by the rotation of the Magnus rotors is obtained by the main electric motor,
wherein in the second operating mode, the control unit shuts down the Magnus rotors and the desired propulsion is obtained by the main electric motor, and
wherein in the third operating mode, the control unit actuates the Magnus rotors to operate at a less than maximum state, wherein a difference of the desired propulsion and the propulsion obtained by the rotation of the Magnus rotors is obtained by the main electric motor.

12. The cargo ship according to claim 11, wherein the control unit receives a wind speed and a wind direction.

13. The cargo ship according to claim 12, wherein the desired course is determined based on a destination and navigation information from a navigation unit.

14. The cargo ship according to claim 13, wherein the control unit controls the rotary speed and the direction of rotation of the Magnus rotors depending on the wind speed, wind direction, destination and navigation information.

* * * * *